United States Patent [19]

Chomet

[11] 4,148,063
[45] Apr. 3, 1979

[54] METHOD AND APPARATUS FOR ENCODING AUDIO SIGNALS IN TELEVISION SYSTEMS

[75] Inventor: Marc Chomet, East Northport, N.Y.

[73] Assignee: Teleglobe Pay-TV System, Inc., Rego Park, N.Y.

[21] Appl. No.: 792,058

[22] Filed: Apr. 28, 1977

[51] Int. Cl.² ............................................... H04N 7/16
[52] U.S. Cl. .................................... 358/114; 358/116; 358/121
[58] Field of Search .......................... 358/116, 121, 114

[56] References Cited

U.S. PATENT DOCUMENTS

| 2,567,539 | 9/1951 | Aram | 358/121 |
|---|---|---|---|
| 3,231,818 | 1/1966 | Court | 358/121 |
| 3,813,482 | 5/1974 | Blonder | 358/116 |
| 3,824,332 | 7/1974 | Horowitz | 358/121 |

Primary Examiner—S. C. Buczinski
Attorney, Agent, or Firm—Marianne Rich

[57] ABSTRACT

At the television transmitting end, the program audio signals to be encoded are limited to a range of 50 to 7,500 Hz. A 202 KHz signal is modulated by the so-limited audio signal and the resultant upper side-band is heterodyned against an upper side-band derived from modulating the 202 Kz signal by video horizontal drive signals. Only the lower side-band created by the heterodyning process is transmitted. At the receiver, the received single sideband signal is applied to a product detector whose other input receives the output of a horizontal drive oscillator operating in synchronism with the corresponding oscillator at the transmitter. The baseband audio signal is separated from the upper sideband signal at the product detector output by means of a low pass filter.

8 Claims, 3 Drawing Figures

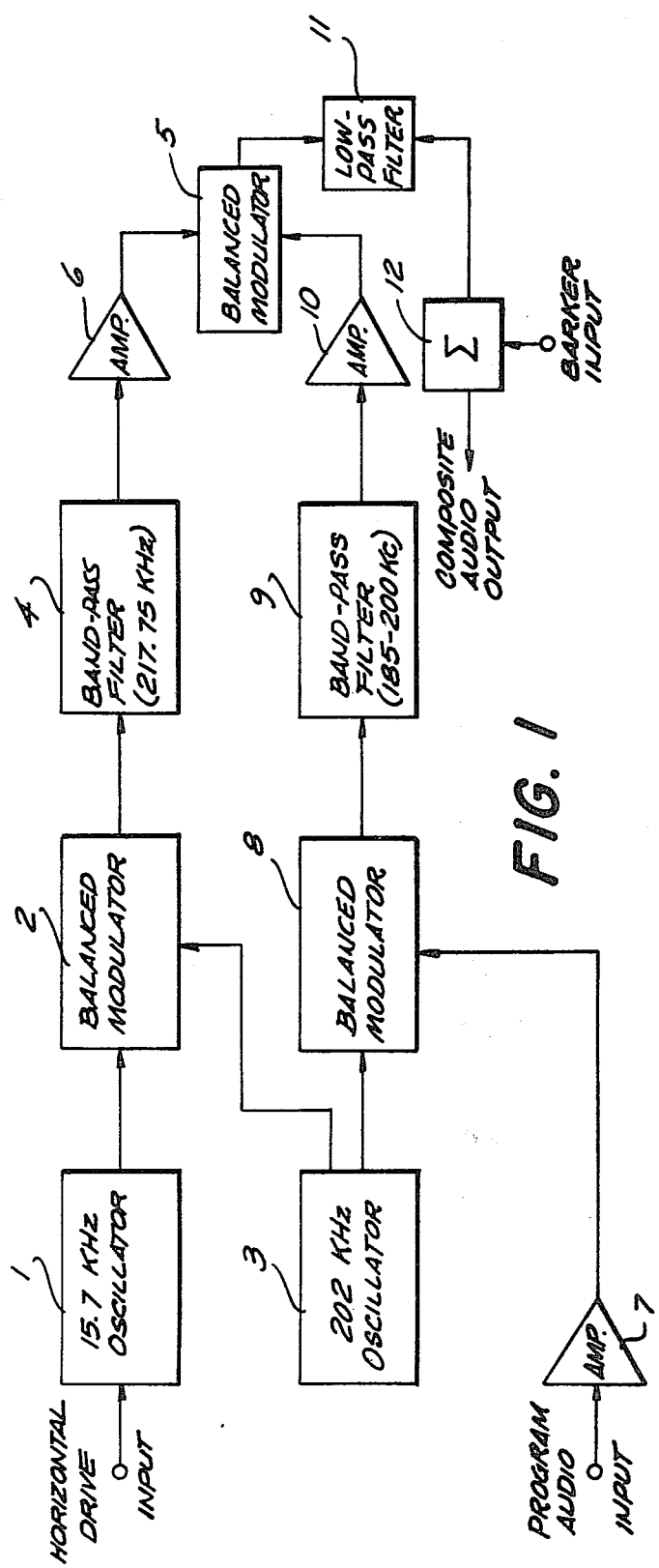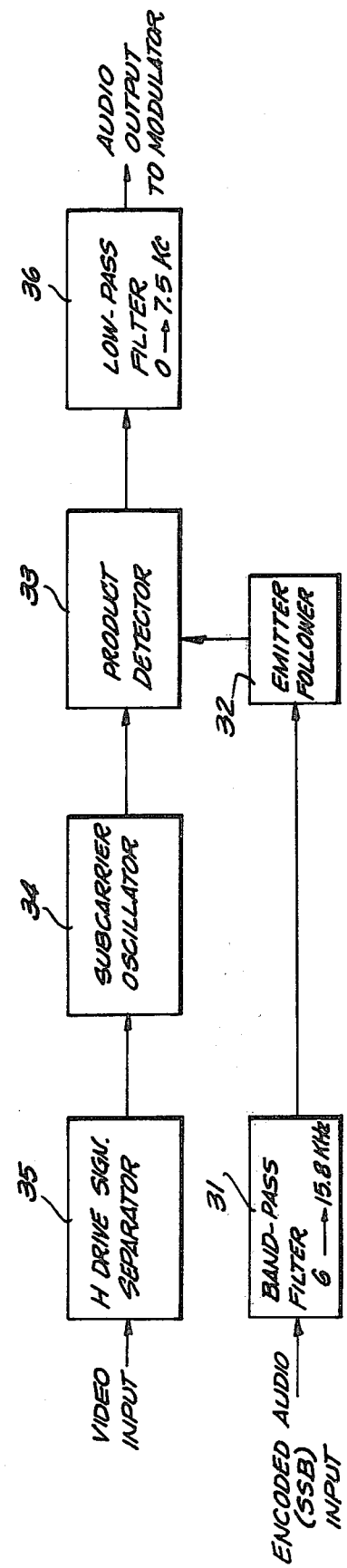

METHOD AND APPARATUS FOR ENCODING AUDIO SIGNALS IN TELEVISION SYSTEMS

BACKGROUND OF THE INVENTION

The present invention relates to systems, such a subscription television systems, wherein it is desired that the audio signal being transmitted be encoded so that it cannot be properly received without activation of a decoding mechanism. In known systems of this type, as, for example, the system disclosed in U.S. Pat. No. 3,824,332 (Horowitz), the audio program signals are encoded by modulation on a suppressed carrier centered above the audio range. This system has the disadvantage that the aural transmitter must be operated above the normal audio range. This requires pre-emphasis for the high frequencies and also requires a larger dynamic range for the transmitter. Further, the spectrum space occupied by the transmitted signal corresponds to the space required for both side-bands. At the receiving end, special detecting equipment is required since the signal is not suitable for utilization by the audio detectors in the standard television receiver. The sound in these systems thus emerges out of the box housing the decoder rather than out of the television set.

SUMMARY OF THE INVENTION

The method of the present invention is carried out in a television system which is adapted to transmit video and accompanying audio program signals. The television system has means for furnishing a sequence of horizontal signals at a horizontal drive frequency. The present method for encoding the program audio signals comprises the steps of limiting the program audio signals to a predetermined audio frequency range having a lower limiting frequency and an upper limiting frequency. It further comprises the step of creating a carrier wave having a carrier wave frequency corresponding to said horizontal drive frequency and amplitude modulating said audio program signals onto said carrier wave, thereby creating a modulated carrier wave having a first and second side band. Finally, the method comprises the step of suppressing said carrier wave and one of said side bands and furnishing a single side band signal having a coded frequency range corresponding to said predetermined audio frequency range and extending from a coded lower limiting frequency to a coded upper limiting frequency, respectively corresponding to said upper and lower limiting frequencies of said predetermined audio frequency range. The single side band signal having this inverted frequency spectrum constitutes the encoded audio program signal.

The novel features which are considered as characteristic for the invention are set forth in particular in the appended claims. The invention itself, however, both as to its construction and its method of operation, together with additional objects and advantages thereof will thus be understood from the following description of specific embodiments when read in connection with the accompanying drawing.

FIG. 1 is a block diagram of the encoder circuitry in accordance with the present invention;

FIG. 3 is a block diagram of the decoding apparatus.

DESCRIPTION OF THE PREFERRED EMBODIMENT

Figure 2:
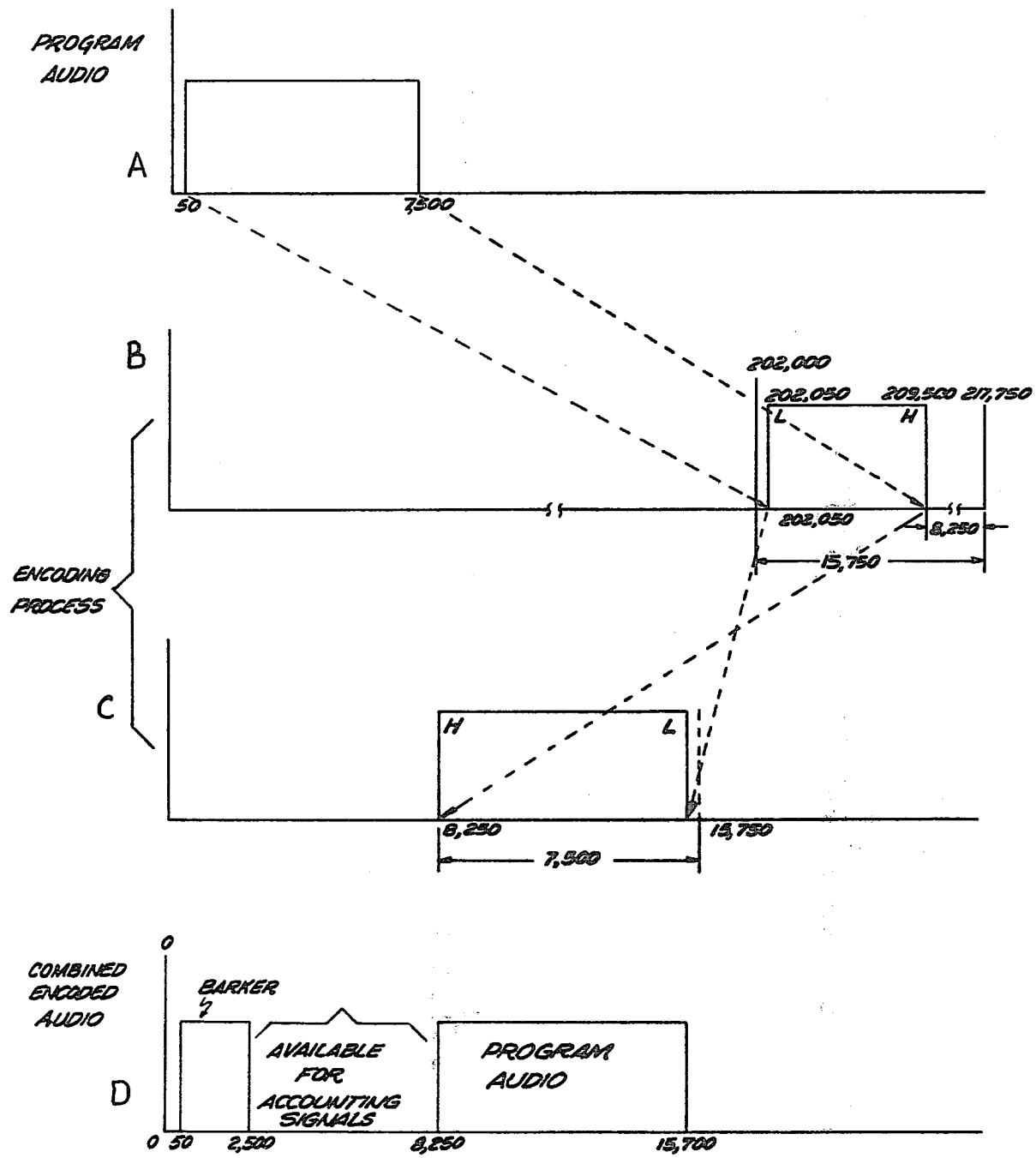
FIG. 2 illustrates the frequency spectra during the encoding process.

Horizontal drive signals, namely either horizontal synchronizing signals or reference pulses as generated in the above-identified patent to Horowitz are applied to the input of a 15.7 KHz oscillator, 1, whose output is connected to one input of a balanced modulator 2. The second input of modulator 2 is connected to the output of a high-frequency oscillator 3. The output of balanced modulator 2 is connected to the input of a band-pass filter, 4, whose output is connected to a balanced modulator 5 through an amplifier 6.

The audio program signals are applied to the input of a filter and amplifier 7 whose output is connected to the input of a second balanced modulator 8. The second input of balanced modulator 8 is connected to the output of high-frequency oscillator 3. The output of balanced modulator 8 is connected to the input of a band pass filter, 9, whose output, the second high-frequency single side band signal, is applied to the input of an amplifier 10. the output of amplifier 10 is connected to the second input of balanced modulator 5. The output of balanced modulator 5 is connected through a low-pass filter 11 to a summing circuit 12. The second input of summing circuit 12 are the Barker signals. The output of summing circuit 12 constitutes the encoded audio signal.

The operation of the above-described equipment is as follows:

The horizontal drive signals available at the television transmitter are utilized to synchronize the 15.75 KHz oscillator in the encoder. This signal is mixed with the output of a crystal-controlled 202 KHz oscillator. The output of balanced modulator 2 contains an upper and a lower side-band signal. This output is filtered by a filter designed to block the lower sideband and pass the upper side-band. The output of band pass filter 4 is thus a 217.75 KHz signal. This signal is amplified in amplifier 6 and applied to one input of balanced modulator 5. The audio program signals are filtered and restricted in amplifier 7 to a range up to 7,500 Hz. The filtered signal is mixed with the high-frequency signal from oscillator 3 in balanced modulator 8. A suppressed carrier double sideband signal results at the output of balanced modulator 8. Band-pass filter 9 suppresses the lower sideband and passes the upper sideband. The signal at the output of band pass filter 9 is thus a signal in the 202,050–209,500 frequency range.

Referring to FIG. 2, the filtered audio program signal is shown in line A. A sharp filtering action at 50 Hz and 7,500 Hz is indicated.

The rectangle shown in line B illustrates the single sideband signal appearing at the output of band pass filter 9, namely the upper sideband signal resulting from the mixing of the audio program signals with the output of oscillator 3. The frequency range over which this signal extends is from 202.500 KHz to 209.5 KHz.

The signals at the outputs of band pass filters 4 and 9 are heterodyned in balanced modulator 5 and the resulting double sideband signal is passed through low-pass filter 11 which eliminates the upper sideband. Line B of FIG. 2 also illustrates the relationship between the two signals being heterodined and line C shows the single sideband signal at the output of low-pass filter 11. Specifically, when the 217.75 KHz signal is mixed with the 209.5 KHz signal, the resultant difference frequency is 8.25 KHz. Thus, the signal derived from the highest end of the audio program signals is represented in the encoded signal at the lower frequency end. Similarly, heterodyning the 217.75 KHz signal with the 202.050 signal results in a 15.750 KHz signal, that is, the signal derived from the lower end of the audio program signals is transmitted at the highest frequency in the encoded signal. It will be noted that the total encoded audio signal encompasses a frequency range of 8.25 to 15.75 KHz, namely a range of 7.500 KHz. Also, the encoded frequencies lie in the normal range acceptable to the audio transmitter.

The frequency spectrum from zero to 8.25 KHz is thus still available. As is shown in line C of FIG. 2, the lower end of the spectrum (in a preferred embodiment, the frequency range from 50 Hz to 2.500 KHz) is used for barker signals. The signals are to be available to the subscriber whether or not he has activated the billing mechanism in the decoder. They are thus transmitted unencoded within the normal audio frequency range. The spectrum between 2.5 KHz and 8.25 KHz is available for accounting signals. The combined output of summing circuit 12 is frequency modulated onto a carrier signal placed 4.5 MHz above the video carrier, as is conventional in television transmission.

The block diagram of the decoding circuitry shown in FIG. 3 includes a band-pass filter 31 which receives the encoded audio input signals. The output of band-pass filter 31 is applied to the input of an emitter-follower 32 whose output is connected to one input of a product detector 33. The other input of product detector 33 receives the output of a sub-carrier oscillator 34 which is synchronized by signals from a horizontal drive signal separator 35. The input to signal separator 35 are the received video signal which has been derived by demodulation from the video carrier, as is standard in television practice.

The output of product detector 33 is the decoded audio output signal.

The above-described equipment operates as follows: Band pass filter 31 eliminates the barker signal from the encoded audio input. Emitter-follower 32 serves only to isolate band-pass filter 31 from product detector 33. Horizontal drive signal separator 35 may respond either to the horizontal synchronization signals or to reference pulses as described in the above-mentioned Horowitz patent. It is used to synchronize subcarrier oscillator 34 with the corresponding oscillator at the encoder. Product detector 33 substantially eliminates the subcarrier frequency and furnishes an output signal having an upper and a lower sideband. The upper sideband is eliminated by low-pass filter 36. The output of low-pass filter 36 is thus the lower sideband resulting from the detection process carried out by product detector 33. This lower sideband lies in the range from zero to 7.5 KHz, that is, it encompasses the region of the audio program signals. Further, since the lower sideband results from the difference between the oscillator frequency and the frequency at the output of band-pass filter 31, the audio signals are in their proper position, that is, the signal which was at the lower end of the audio program signals is again at the lower end of the audio output of low-pass filter 36. The same is, of course, true for the signal at the high end of the encompassed frequency spectrum. The signal at the output of low-pass filter 36 is thus a standard signal suitable for modulation onto a sub-carrier for reception in the standard television receiver.

The above-described system both at the transmitter and the receiver results in a securely encoded audio signal with a minimum of required equipment. It should be noted that the high frequency modulation process shown in FIG. 1 can be eliminated and the audio program signal be directly modulated onto a 15.75 KHz carrier if sufficiently accurate modulation equipment is available. Under these circumstances, units 2, 3, 4, 8 and 9 can be eliminated and the 15.75 KHz oscillator signal can be directly heterodyned with the incoming audio program signal.

While the invention has been illustrated in preferred embodiments, it is not to be limited to the circuits and structures shown since many variations thereof will be evident to one skilled in the art and are intended to be encompassed in the present invention as set forth in the following claims.

What is claimed is:

1. In a television system adapted to transmit video signals and accompanying audio program signals, said system having means for furnishing a sequence of horizontal signals at a horizontal drive frequency, a method for encoding said audio program signals, comprising, in combination, the steps of limiting said program audio signals to a predetermined audio frequency range extending from a lower limiting frequency to an upper limiting frequency; creating an unmodulated carrier wave having a carrier wave frequency corresponding to said horizontal drive frequency; amplitude modulating said audio program signals onto said carrier wave, thereby creating a modulated carrier wave having a first and second sideband; and suppressing said carrier wave and one of said sidebands and furnishing a single sideband signal having a coded frequency range corresponding to said predetermined audio frequency range and extending from a coded lower limiting frequency to a coded upper limiting frequency, respectively corresponding to said upper and lower limiting frequencies of said predetermined audio frequency range, said single sideband signal constituting an encoded audio program signal.

2. A method as set forth in claim 1, wherein said step of amplitude modulating said audio program signals onto said unmodulated carrier wave comprises the steps of furnishing an oscillator signal having an oscillator frequency substantially exceeding said horizontal drive frequency, modulating said horizontal signals onto said oscillator signal and creating a first high-frequency sngle sideband signal corresonding to the so-modulated oscillator signal, modulating said audio program signal onto said oscillator signal and creating a second high-frequency single sideband signal corresponding to said oscillator signal modulated with said audio program signals, and heterodyning said first and second high-frequency single sideband signals, thereby creating said modulated carrier wave having said first and second sideband signals.

3. A method as set forth in claim 2, wherein said first and second sideband signals are, respectively, the lower and upper sideband signals; and wherein said step of suppressing one of said sideband signals comprises suppressing said upper sideband signals.

4. A method as set forth in claim 2, wherein said coded frequency range is outside of said predetermined audio frequency range and said coded upper limiting frequency is less than said horizontal drive frequency.

5. A method as set forth in claim 4, further comprising the step of generating barker signals within said predetermined audio frequency range; and adding said barker signals to said encoded audio program signals.

6. In a television system adapted to transmit video and accompanying audio program signals and having means for furnishing horizontal signals at a horizontal drive frequency, apparatus for encoding said audio program signals, comprising, in combination, limiter means for limiting said audio program signals to a predetermined audio frequency range extending from a lower limiting frequency to an upper limiting frequency; carrier wave generating means for generating an unmodulated carrier wave having a carrier wave frequency corresponding to said horizontal drive frequency; modulator means for modulating said audio program signals onto said carrier wave, thereby creating first and second sideband signals; and filter means connected to said modulator means for passing said first sideband signals and blocking said second sideband signals, the so-passed first sideband signals constituting encoded audio program signals.

7. Apparatus as set forth in claim 6, wherein said modulator means comprises first oscillator means for furnishing an oscillator signal having an oscillator frequency substantially exceeding said horizontal drive frequency; first modulator means for modulating said first oscillator signals with said horizontal signals and generating a first high-frequency single sideband signal corresponding to the so-modulated oscillator signal; second modulator means for modulating said oscillator signal with said audio program signals and furnishing a second high-frequency single sideband signal corresponding to said oscillator signal modulated by said audio program signals, and third modulator means for heterodyning said first and second high-frequency single sideband signals, thereby creating said modulated carrier wave having said first and second sideband signals.

8. Apparatus as set forth in claim 6, wherein said coded frequency range is outside of said predetermined audio frequency range; further comprising means for furnishing a barker signal within said predetermined audio frequency range; and combining means for combining said barker signal with said encoded audio program signals.

* * * * *